Dec. 24, 1935.  E. A. JOHNSTON  2,025,514
BOLL DEFLECTOR FOR COTTON PICKERS
Filed Oct. 29, 1934
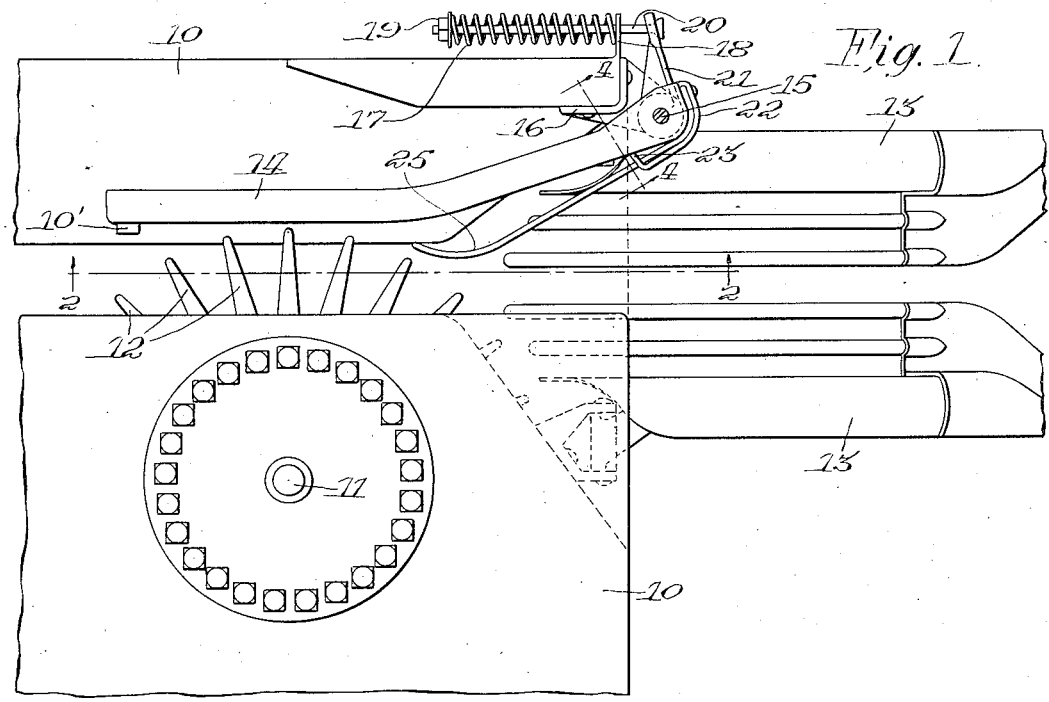
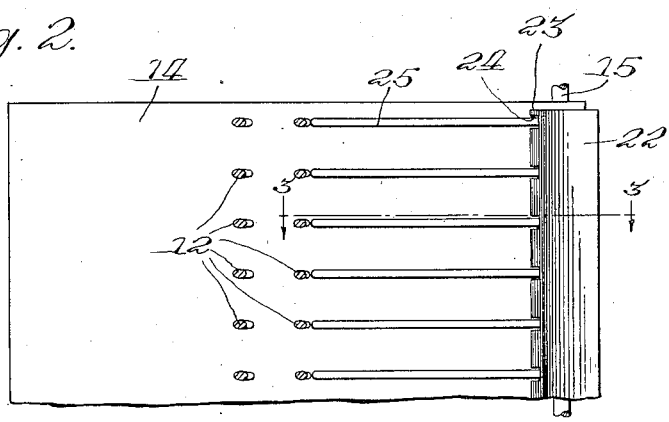
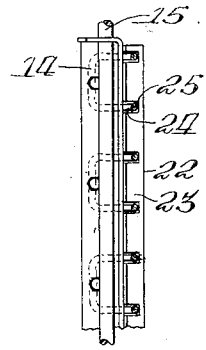
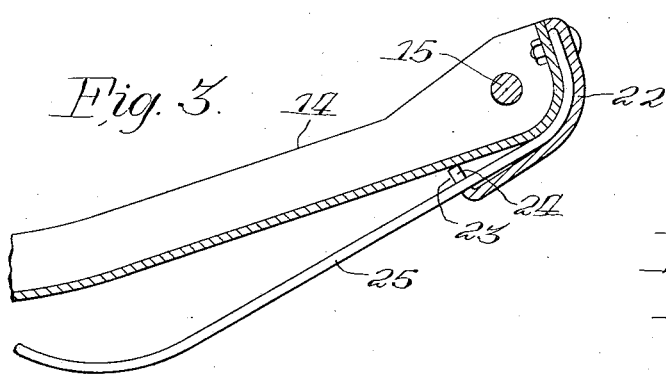
Inventor
Edward A. Johnston
By V. F. Lavagne
Atty Patented Dec. 24, 1935

2,025,514

UNITED STATES PATENT OFFICE 2,025,514

BOLL DEFLECTOR FOR COTTON PICKERS

Edward A. Johnston, Chicago, Ill., assignor to International Harvester Company, a corporation of New Jersey Application October 29, 1934, Serial No. 750,436

13 Claims. (Cl. 56—36)

This invention relates to an attachment for cotton harvesters. More specifically it relates to a boll deflector and guide for cotton pickers.

In the picking of cotton, one type of machine is used which is provided with a rotating drum on which a plurality of rotating picking spindles are mounted. In this type of picker it is necessary to closely space the spindles and to press the plants firmly into contact with the spindles in order to pick a satisfactory percentage of the cotton. As cotton does not ripen uniformly, during the first pickings there are an appreciable number of green, unopened bolls. It has been found that these are sometimes injured by being punctured or otherwise deformed by the picking spindles when they pass between the deflector and the spindles. Although the spindles are arranged in axially spaced, circumferential rows with the spacing sufficient to accommodate a green cotton boll, the bolls do not always fall in this space and are often injured by the spindles.

The principal object of the present invention is to provide in a picker having spindles mounted upon a drum as above described, deflecting and guiding means positioned and arranged to guide the green bolls between the spindles for preventing injury thereto.

Another object is to provide such a guiding means on a spring pressed deflector which is used to contact the plant with the picking drum.

These objects and others, which will become evident as the description proceeds, are accomplished by a construction such as shown in the drawing, in which:

Figure 1 is a plan view of a portion of a cotton picker of the rotating drum type showing diagrammatically the essential elements thereof with which the guiding means forming the invention cooperate;

Figure 2 is a section taken on the line 2—2 of Figure 1;

Figure 3 is a section taken on the line 3—3 of Figure 2; and,

Figure 4 is a section taken on the line 4—4 of Figure 1.

As this invention relates particularly to a guiding and deflecting means, only such parts of a cotton picker have been shown as are necessary to illustrate the construction and operation of the parts making up the invention. Said parts may be applied to any cotton picker of the spindle-carrying drum type, such as shown in my United States Patent No. 1,888,506 dated Nov. 22, 1932.

A frame structure 10 forms a support for a vertical drum carrying shaft 11, on which the drum structure is rotatably mounted, being driven by suitable mechanism. Cotton picking spindles 12 are arranged around the drum structure in circumferential rows, spaced vertically axially along the drum. This construction and the means for driving the rotating parts thereof are shown in the patent above referred to. Forwardly of the frame structure 10 extending in the direction of travel of the machine during operation are plant lifters and guides 13. Said guides lift the lower portions of the plant and assist in guiding the plant into the throat of the machine, which is formed between the picking spindles 12 of the drum structure and a deflector 14. Said deflector is pivotally mounted on a vertical shaft 15 secured by brackets 16 to the frame structure. A spring 17 abutting a lug 18 on the frame structure, and an adjustable stop 19 on a tension rod 20, serve to resiliently urge the deflector against a stop 18' mounted on the frame structure with the deflector adjacent the outer ends of the picking spindle. The rod 20 is provided with a head, which engages an apertured bracket 21 carried by the deflector 14.

The deflector 14 is shaped to form cooperatively with the drum structure, a throat into which the cotton plants pass during travel of the machine. The resiliency provided by the spring 17 provides a yielding movement to prevent injury to the plants while maintaining them in contact with the picking spindles.

On the forward side of the deflector 14 in proximity to the pivoting axis, a sheet metal clamping member 22 is secured. Said member is provided at its rear edge with a turned-in flange 23, which is provided with a plurality of spaced notches 24 in horizontal alignment with the rows of spindles on the picking drum. Resilient guiding rods 25 formed in pairs, as shown in Figure 4, are secured in position by the member 22 and extend outwardly and rearwardly from the notches 24 in spaced relation with respect to the deflector 14. Said rods are curved outwardly at their rearward ends, terminating with the free ends closely adjacent the path of travel of the tips of the picking spindles.

In the operation of a picker embodying the novel deflector and guide means as above described, the plant is directed into the throat of the machine and is pressed against the picking spindle by the deflector 14. The green bolls, which pass into the machine, are engaged between the guide rods 25, whereby they are directed between the picking spindles 12. In this manner, injury to the bolls is reduced to a surface scratching, and they are not punctured, as would often be the case in a device in which means were not provided for guiding them between the spindles. The rods 25 are sufficiently resilient to bend downwardly against the deflector 14 and to bend laterally without permanent distortion. Said rods return to their original positions when the lateral strain or downward pressure is removed. By constructing a deflecting and guiding means above described, injury to the green bolls of the cotton plant can be materially reduced during the first pickings. This is an important advance in the art, as mechanical injury to green plants has been one difficulty encountered in utilizing mechanically operated pickers.

Although a particular modification has been illustrated and described, it is to be understood that applicant claims as his invention all modified forms of plant deflecting and guiding means set forth in the annexed claims.

What is claimed is:

1. In a cotton picker having a rotatable drum structure carrying axially spaced rows of picking spindles and in combination therewith, spaced boll guides positioned to direct unopened bolls between the rows of spindles.

2. The combination with a cotton picker having a vertical rotatable drum carrying picking spindles rotatably mounted thereon in axially spaced rows, of spaced boll guides arranged substantially in horizontal planes of the spindles whereby unopened bolls are directed between the rows of spindles.

3. In a cotton picker having a rotatable drum structure carrying axially spaced rows of picking spindles and in combination therewith, spaced resilient boll guides having free ends adjacent the path of travel of the picking spindles and positioned to direct unopened bolls between the rows of spindles.

4. The combination with a cotton picker having a vertical rotatable drum carrying picking spindles rotatably mounted thereon in axially spaced rows, of a plant deflector mounted adjacent the outer ends of said spindles, and resilient boll guides attached at one end to the deflector and arranged substantially in the horizontal planes of the spindles whereby unopened bolls are directed between the rows of spindles.

5. In a cotton picker having a rotatable drum structure carrying axially spaced rows of picking spindles and in combination therewith, a plant deflector resiliently mounted adjacent the outer ends of the spindles, and boll guides positioned to direct unopened bolls between the rows of spindles.

6. The combination with a cotton picker having a vertical rotatable drum carrying picking spindles rotatably mounted thereon in axially spaced rows, of a plant deflector mounted adjacent the outer ends of said spindles, and boll guides arranged substantially in horizontal planes of the spindles whereby unopened bolls are directed between the rows of spindles.

7. In a cotton picker and in combination, a frame structure, a drum structure rotatably mounted on a vertical axis on said frame structure, picking spindles rotatably mounted on the drum structure arranged in circumferential, axially spaced rows, and guide elements carried by the frame structure, said elements being in spaced relation and extending in alignment with the rows of spindles whereby unopened cotton bolls are directed between the picking spindles.

8. In a cotton picker and in combination, a frame structure, a drum structure rotatably mounted on a vertical axis on said frame structure, picking spindles rotatably mounted on the drum structure arranged in circumferential, axially spaced rows, a deflector secured to the frame structure forwardly of the drum axis for directing plants against the drum structure, and guide elements connected at one end to the deflector and extending outwardly and rearwardly therefrom, said elements being in spaced relation and extending in alignment with the rows of spindles whereby unopened cotton bolls are directed between the picking spindles.

9. In a cotton picker and in combination, a frame structure, a drum structure rotatably mounted on a vertical axis on said frame structure, picking spindles rotatably mounted on the drum structure arranged in circumferential, axially spaced rows, a deflector pivotally mounted on a vertical axis on the frame structure forwardly of the drum axis, said deflector being provided with resilient means for directing plants against the drum structure, and guide elements carried by the deflector and extending outwardly and rearwardly therefrom, said elements being in spaced relation and extending in alignment with the rows of spindles whereby unopened cotton bolls are directed between the picking spindles.

10. In a cotton picker and in combination, a frame structure, a drum structure rotatably mounted on a vertical axis on said frame structure, picking spindles rotatably mounted on the drum structure arranged in circumferential, axially spaced rows, a deflector pivotally mounted on a vertical axis on the frame structure forwardly of the drum axis, said deflector being provided with resilient means for directing plants against the drum structure, and guide elements carried by the deflector and extending outwardly and rearwardly therefrom, said elements being in spaced relation and extending in alignment with the rows of spindles whereby unopened cotton bolls are directed between the picking spindles.

11. In a cotton picker having a movable structure carrying spaced rows of picking spindles and in combination therewith, spaced boll guides positioned to direct unopened bolls between the rows of spindles.

12. In a cotton picker having a movable structure carrying spaced rows of picking spindles and in combination therewith, spaced resilient boll guides having free ends adjacent the path of travel of the picking spindles and positioned to direct unopened bolls between the rows of spindles.

13. The combination with a cotton picker having a movable structure carrying picking spindles rotatably mounted thereon in vertically spaced horizontal rows, of a plant deflector mounted adjacent the outer ends of said spindles, and resilient boll guides attached at one end to the deflector and arranged substantially in the horizontal planes of the spindles whereby unopened bolls are directed between the rows of spindles.

EDWARD A. JOHNSTON.